May 12, 1970      J. V. DEJOUX      3,511,567
METHOD OF REPRINTING OLD MOTION PICTURE FILMS
Filed June 8, 1967
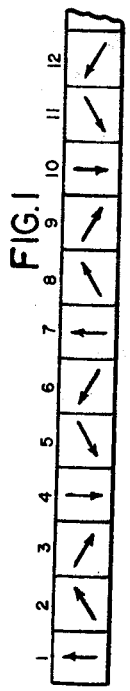
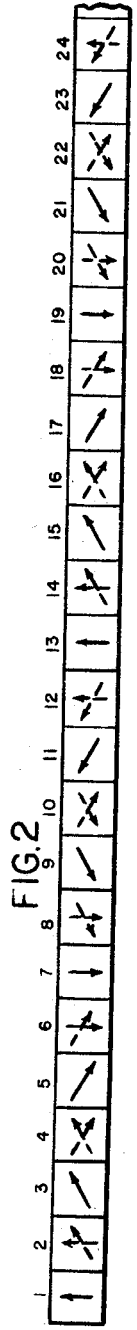
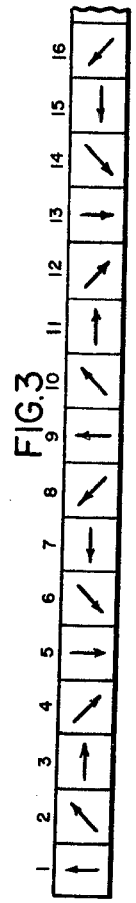
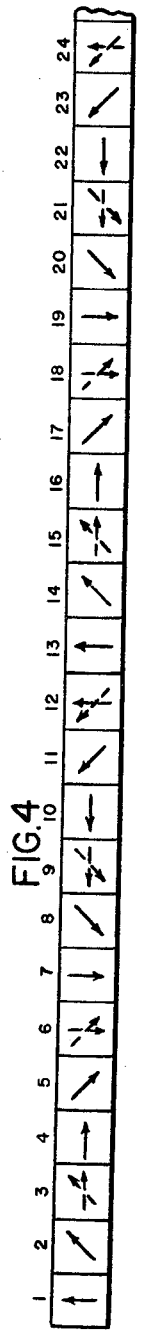
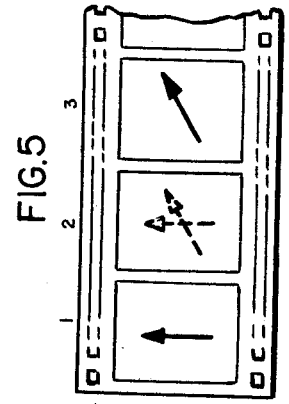
INVENTOR.
JEAN VÉRAN DEJOUX
BY
ATTORNEYS

United States Patent Office 3,511,567
Patented May 12, 1970

3,511,567
METHOD OF REPRINTING OLD MOTION PICTURE FILMS
Jean Véran Dejoux, Paris, France, assignor, by mesne assignments, to Optical Systems Corporation, New York, N.Y., a corporation of Delaware
Filed June 8, 1967, Ser. No. 644,722
Int. Cl. G03b *21/134*
U.S. Cl. 355—132                                6 Claims

ABSTRACT OF THE DISCLOSURE

A method of reprinting old motion picture films, originally photographed at rates below 24 frames per second, in such a manner that the reprint may be projected at 24 frames per second. In reprinting the film a number of extra frames is inserted such that the total number of frames is sufficient for projection at 24 frames per second. Each of the extra frames is inserted between two original frames and is composed of the superimposed images of these two original frames.

---

In the early days of the motion picture industry, it was customary to photograph motion pictures at relatively low rates of speed as for example, at rates as low as ten frames per second. Prints made therefrom were usually projected for viewing at the same rate at which the photographs were made. That is, if pictures were photographed at the rate of ten frames per second, for example, they were also projected at the rate of ten frames per second in order to maintain the normal space-time relationships of moving objects as originally photographed. Motion pictures projected at these low rates of speed were characterized by excessive flicker due to the fact that the eye of the observer was able to detect the interruptions between successive projected images.

Subsequently, as research developed additional knowledge of the phenomenon of persistence of vision, and as improved cameras, projectors and films became available which were capable of operating at higher rates of speed, motion pictures were photographed and projected at progressively higher speeds such as twelve, sixteen, twenty and twenty-four frames per second.

Today, and for some years past, a speed of twenty-four frames per second has been regarded as the standard rate of speed for photographing and projecting motion pictures, and at this rate flicker is virtually non-existent, for the eye of the observer does not detect the interruptions between successive projected images.

Many motion picture producers have large numbers of motion picture films in storage which were photographed at rates less than twenty-four frames per second. If these films are projected today at the rates at which they were originally photographed, the resulting flicker is so objectionable that it will not be tolerated by many motion picture patrons who have become accustomed to flickerless projection. On the other hand, if such films are projected today at the standard rate of twenty-four frames per second, the action is speeded up to such extent that the original space-time relationship is destroyed and the movement of the objects depicted is abnormal and frequently ludicrous.

Consequently, the large number of films in storage which were photographed at rates less than twenty-four frames per second, and which potentially constitute an asset of great value, lie idle and unused because of lack of a satisfactory method of projecting them for exhibition either on a screen or by television.

In U.S. Pat. No. 3,271,097 in which I am co-inventor, a method and apparatus for projecting motion pictures is disclosed which permits projection at low rates of speed, as for example at rates as low as six to eight frames per second, without flicker. However, the projection method disclosed therein requires the use of special projectors which are not presently available to motion picture theaters and other exhibitors.

It is an object of the present invention to provide a method of reprinting old motion picture films which have been protographed at rates less than twenty-four frames per second, in such manner that they may be projected in standard motion picture projectors at the standard rate of twenty-four frames per second while maintaining substantially the normal space-time relationships of moving objects as originally photographed.

It is a further object of the invention to provide a motion picture film reprinted from a film strip originally photographed at a rate less than twenty-four frames per second which is capable of being projected at a rate of twenty-four frames per second while preserving substantially the space-time relationships as originally photographed.

It will be understood that if the original space-time relationships of moving objects are to be maintained when the pictures are reprinted for projection at twenty-four frames per second, the successive pictures as reprinted on the new film strip must be spaced at intervals such that when projected, the images projected therefrom will be projected at substantially the same time intervals at which the original pictures were photographed.

This is illustrated in the following Table 1, which represents one second of time.

TABLE 1

| sec. | 12 per sec. | 16 per sec. | 10 per sec. | 20 per sec. |
|---|---|---|---|---|
| 1 |  | 1 | 1 | 1 |
| 2 | X | 2 | X | 2 |
| 3 | 2 | X | X | 3 |
| 4 | X | 3 | 2 | 4 |
| 5 | 3 | 4 | X | X |
| 6 | X | X | 3 | 5 |
| 7 | 4 | 5 | X | 6 |
| 8 | X | 6 | X | 7 |
| 9 | 5 | X | 4 | 8 |
| 10 | X | 7 | X | X |
| 11 | 6 | 8 | 5 | 9 |
| 12 | X | X | X | 10 |
| 13 | 7 | 9 | X | 11 |
| 14 | X | 10 | 6 | 12 |
| 15 | 8 | X | X | X |
| 16 | X | 11 | 7 | 13 |
| 17 | 9 | 12 | X | 14 |
| 18 | X | X | X | 15 |
| 19 | 10 | 13 | 8 | 16 |
| 20 | X | 14 | X | X |
| 21 | 11 | X | 9 | 17 |
| 22 | X | 15 | X | 18 |
| 23 | 12 | 16 | X | 19 |
| 24 | X | X | 10 | 20 |

In the first column, headed "1 sec.," the numerals identify successive frames of a film strip intended for projection at twenty-four frames per second. In the second column, headed "12 per sec." the numerals identify the successive frames of a film strip photographed at twelve frames per second, and illustrate the manner in which said frames are reprinted on the new film strip for projection at twenty-four frames per second.

Thus, the picture of frame 1 of the original film strip would be reprinted on frame 1 of the new film strip, frame 2 of the original would be reprinted on frame 3 of the new, frame 3 of the original would be reprinted on frame 5 of the new, and so on. It will be observed that when so printed, the original space-time relationships will be substantially maintained during projection of the new film strip at twenty-four frames per second. On the expiration of one-half second, for example, after projection of frame 12 of the new film strip, projection of frame 13 carrying the picture of original frame 7 will project the image of frame 13 at the same time the image of frame 7 of the original would have been projected when projected at twelve frames per second.

In the third column of Table 1, headed "16 per sec.," the numerals identify the successive frames of a film strip photographed at sixteen frames per second, and illustrates the manner in which said frames are reprinted on the new film strip for projection at twenty-four frames per second.

In this case, as shown, the picture of frame 1 of the original film strip would be reprinted on frame 1 of the new film strip, frame 2 of the original would be reprinted on frame 2 of the new, but frame 3 of the original would be reprinted on frame 4 of the new and so on. Again, it will be observed that when so printed, the original space-time relationships will be substantially maintained, although there will be a slight distortion due to the fact that the interval between the projection of frames 2 and 4 of the new film strip, carrying the pictures of frames 2 and 3 of the old, will be longer than the interval between the projection of frames 1 and 2 of the new film strip, carrying the pictures of frames 1 and 2 of the old. A similar slight distortion will occur within each group of three projections. However, on the expiration of one-half second, after projection of frame 12 of the new film strip, projection of frame 13 carrying the picture of original frame 9 will project the image of frame 13 at the same time the image of frame 9 of the original would have been projected when run at sixteen frames per second.

In column 4 of Table 1, headed "10 per sec." and in column 5 headed "20 per sec." additional examples are illustrated. In column 4, the numerals identify the successive frames of a film strip photographed at ten frames per second, and in column 5, the numerals identify the successive frames of a film strip photographed at twenty frames per second. In each of these examples, as in the preceding example, there will be slight distortions within groups of frames projected within the interval of one second, but in all cases these distortions are so slight that they are not noticeable when the pictures are projected at twenty-four frames per second.

In columns 2, 3, 4 and 5 of Table 1, the letters "X" identify frames of the new reprinted film strips which do not receive a print of a single picture as recorded on the original film strips. According to the present invention, the frames so identified are printed with a composite of two pictures recorded on preceding and successive frames of the series. For example, in column 2 of Table 1, the "X" opposite frame 2 of the new film strip identifies a frame on which is printed a composite of frames 1 and 2 of the original film strip, and the "X" opposite frame 4 of the new film strip identifies a frame on which is printed a composite of frames 2 and 3 of the original. In column 3, the "X" opposite frame 3 of the new film strip identifies a frame on which is printed a composite of frames 2 and 3 of the original, and so on.

In the accompanying drawings, FIG. 1 is a diagrammatic illustration of a film strip showing a sequence of pictures of an arrow which is assumed to be rotating at two revolutions per second with the pictures photographed at twelve frames per second. The twelve frames illustrated, therefore, represent a sequence of twelve pictures photographed during one second.

FIG. 2 is a similar diagrammatic illustration of a film strip showing the sequence of pictures of FIG. 1 reprinted on a new film for projection at twenty-four frames per second with composite frames interpolated in the sequence according to the invention. FIG. 2 corresponds to the sequence of column 2 of Table 1.

FIG. 3 is a diagrammatic illustration of a film strip showing a sequence of pictures of an arrow which is assumed to be rotating at two revolutions per second as in FIG. 1, but with the pictures photographed at sixteen frames per second. The sixteen frames illustrated represent a sequence of sixteen pictures photographed during one second.

FIG. 4 is a similar diagrammatic illustration showing the sequence of pictures of FIG. 3 reprinted for projection at twenty-four frames per second with composite frames interpolated in the sequence. FIG. 4 corresponds to the sequence of column 3 of Table 1.

FIG. 5 is a full size representation of the first three frames of the film strip of FIG. 2.

In FIG. 1, the arrow of frame 2 has moved 60° from the position of frame 1. In FIGS. 2 and 5, frame 1 of FIG. 1 is printed in frame 1, frame 2 of FIG. 1 is printed in frame 3, and a composite of frames 1 and 2 of FIG. 1 is printed in frame 2.

Such composite pictures may be printed on the new film strip by methods known to the art, as for example, by the use of the motion picture projector disclosed in U.S. Pat. No. 3,271,097, of which I am joint inventor. In the method of projection described in the said patent a series of successive pictures which may be identified as frames A, B, C, D, etc. are projected in superposed pairs, as A+B, B+C, C+D, etc. At the beginning of the projection of pair A+B, for example, the luminous intensity of the projected image of frame A is at a maximum, while the luminous intensity of the projected image of frame B is at zero. During the continued projection of the pair A+B, the luminous intensity of the projected image of frame A is gradually decreased from maximum to zero, while the luminous intensity of the projected image of frame B is gradually increased from zero to a maximum. Then frame A is moved out, frame B is paired with frame C and the process is repeated. The total luminous intensity of the superposed projected images remains substantially constant throughout the projection.

Now if such a projector is combined with a camera in such manner that the projected images of the projector are focused on a photosensitive film strip in the camera, the following becomes possible.

(1) Frame 1 of the photosensitive film strip is exposed to frame A while the luminous intensity of its projected image is at maximum. This exposure records the image of frame A.

(2) Frame 2 of the photosensitive film strip is then exposed to frames A+B at a time when, due to the decrease in the luminous intensity of the projected image of frame A and the increase in the luminous intensity of the projected image of frame B, the luminous intensities of the superimposed projected images of the two frames are substantially equal. This exposure results in recording a composite picture comprising the superposed images of frames A and B.

(3) FIG. 3 of the photosensitive film strip is then exposed to frame B while the luminous intensity of its projected image it at maximum. This exposure records the image of frame B.

(4) By repeating the foregoing a film strip having the frame sequence of column 2 of Table 1 may be prepared.

(5) By suitable control of the exposure of the frames of the photosensitive film strip, it is possible to prepare film strips having the frame sequences of columns 3, 4 and 5 of Table 1 or any other desired sequence.

In the specific example above described, it has been assumed that at the time of exposure of the photosensitive film strip to frame A+B to record a composite picture, the luminous intensities of the projected images of frames A and B are substantially equal. It will be understood, however, that the said luminous intensities need not be equal, but may be of any desired values, as for example, the luminous intensity of the projected image of frame A may be 75% of the total, and that of frame B may be 25% of the total. These values may be adjusted, as desired, to produce the desired results.

After development of the photosensitive film strip, prints thereof may be prepared for projection at the standard rate of twenty-four frames per second, it being understood that the space-time relationships of the original photography will be substantially preserved during such projection.

It will be noted that the method of reprinting hereinbefore described results in a novel film strip in which the normal sequence of pictures as originally photographed and as originally recorded is interrupted at intervals by an interpolated picture which comprises the superimposed images of a preceding and a successive picture of the original sequence. Further, it will be noted that in order to maintain the original space-time relationships of the moving objects as originally photographed, the number of interpolated pictures must be equal, or at least approximately equal, to the difference between twenty-four and the rate at phich the original strip was photographed. That is, if the original strip was photographed at twelve frames per second, there should be twelve interpolated frames. If the original strip was photographed at 16 frames per second, there should be eight interpolated frames, and so on, all as indicated in Table 1.

It will be understood that the invention may be variously modified and embodied within the scope of the subjoined claims.

I claim as my invention:

1. The method of reprinting a motion picture film strip having a series of pictures recorded thereon in sequence, which said pictures have been photographed successively at a given rate per second, which comprises recording said pictures successively on a second film strip, the sequence of pictures as recorded on said first film strip being interrupted as said pictures are recorded on said second strip by recording on said second strip, at intervals between the successive pictures as recorded on said first strip, a composite picture comprising the superposed images of a preceding and a successive picture of the sequence.

2. The method of reprinting a motion picture film strip having a series of pictures recorded thereon in sequence, which said pictures have been photographed successively at a given rate per second, which comprises interpolating composite pictures, each comprising the superposed images of a preceding and a successive picture of the sequence, at intervals between successive pictures of the sequence.

3. The method according to claim 1 in which the given rate per second at which said pictures have been photographed is less than twenty-four frames per second, and in which the number of composite pictures interpolated in the sequence within each series of twenty-four pictures recorded on said second film strip is equal to twenty-four less the given rate per second at which said pictures have been photographed.

4. A developed motion picture film strip having a series of pictures recorded thereon from a first film strip originally photographed at a given rate per second, the normal sequence of said pictures as originally recorded on said first film strip being interrupted at intervals by an interpolated picture recorded thereon which comprises the superposed images of a preceding and a successive picture of the original series.

5. A developed motion picture film strip according to claim 4 in which the said preceding and successive pictures of the series are the next preceding and next successive pictures, respectively, of the series.

6. A developed motion picture film strip according to claim 4 in which the number of the interpolated pictures within each series of twenty-four pictures recorded thereon is equal to the difference between twenty-four and the said given rate per second at which said first film strip was originally photographed.

References Cited

UNITED STATES PATENTS

| 1,815,455 | 7/1931 | Waller | 352—46 |
| 1,952,340 | 3/1934 | Spivack | 352—239 X |
| 3,271,097 | 9/1966 | Montremy | 352—87 X |

NORTON ANSHER, Primary Examiner

M. H. HAYES, Assistant Examiner

U.S. Cl. X.R.

352—46, 87, 239